United States Patent [19]

Blackshaw

[11] 4,271,052

[45] Jun. 2, 1981

[54] CARBOXYLATED NITRILE RUBBER VULCANIZATES

[75] Inventor: George C. Blackshaw, Sarnia, Canada

[73] Assignee: Polysar Limited, Sarnia, Canada

[21] Appl. No.: 49,110

[22] Filed: Jun. 18, 1979

[30] Foreign Application Priority Data

Jul. 17, 1978 [CA] Canada ................................. 307575

[51] Int. Cl.³ .......................... C08L 9/02; C08L 13/00
[52] U.S. Cl. .......................... 260/23.7 N; 260/23 AR; 260/23 EP; 260/23.7 B; 260/23.7 M
[58] Field of Search .................... 260/23.7 N, 23.7 M, 260/23.7 B, 23 EP, 23 AR

[56] References Cited

U.S. PATENT DOCUMENTS

| | | | |
|---|---|---|---|
| 2,473,319 | 6/1949 | Winkelmann | 260/23.7 N |
| 2,569,502 | 10/1951 | Swern et al. | 260/23.7 N |
| 3,063,961 | 11/1962 | Frank | 260/23.7 N |
| 3,297,792 | 1/1967 | Coaker et al. | 260/23.7 N |
| 3,406,136 | 10/1968 | Scarso et al. | 260/23.7 N |
| 3,424,818 | 1/1969 | Hawley et al. | 260/23.7 N |
| 3,625,876 | 12/1971 | Fitko | 260/23.7 N |
| 4,043,947 | 8/1977 | Talsma et al. | 260/23.7 M |

FOREIGN PATENT DOCUMENTS 50-105750 8/1975 Japan ................................. 260/23.7 N

*Primary Examiner*—Ronald W. Griffin
*Attorney, Agent, or Firm*—Stevens, Davis, Miller & Mosher

[57] ABSTRACT

A process for the production of improved vulcanizates is described wherein a carboxylated butadiene-acrylonitrile polymer is compounded with an epoxidized hydrocarbyl compound which on vulcanization yields a vulcanizate having generally improved strength properties and reduced compression set. Such vulcanizates can advantageously be used as O-rings, gaskets and the like.

8 Claims, No Drawings

CARBOXYLATED NITRILE RUBBER VULCANIZATES

This invention is directed to a process for the production of a plasticized carboxylated butadiene-acrylonitrile rubbery vulcanizate having improved properties.

It is well known in the processing of natural and synthetic polymers to add plasticizers, especially during the compounding of the polymer, and that the elastomeric vulcanizates derived from such plasticized polymers have a desirable balance of properties. The chemical form of the plasticizers used may vary from one specific polymer to another—usually a non-polar plasticizer, such as a hydrocarbon oil, is used with non-polar polymers and polar plasticizers are used with polar polymers. Butadiene-acrylonitrile polymers, usually generally referred to as nitrile polymers, are well known and constitute one member of the polar polymer group; the plasticizers used with the nitrile polymers are polar materials such as esters, certain resins, phosphate compounds and other like materials. Examples of suitable plasticizers for nitrile polymers include alkyl or alkoxy adipates, phthalates and sebacates, coumarone-indene resins, epoxides of soybean oil, and the alkyl or alkoxy phosphates. Generally, plasticizers would not be added to nitrile polymers when the vulcanizate characteristics are critical with respect to non-extractability and to strength properties. It is well known that, for polymers containing plasticizer, the resulting vulcanizates generally possess somewhat reduced overall strength properties.

Carboxylated nitrile polymers, which are butadiene-acrylonitrile-carboxylated monomer polymers, are well known and have recently been receiving more attention in the rubber industry. Because of the carboxyl groups in the polymer, different methods may be used for vulcanizing these polymers which make use of the reaction of carboxyl groups with metal compounds, especially metal oxide compounds. The vulcanizates of carboxylated nitrile polymers have been found to be suitable for certain special uses due to the high strength, hardness and abrasion resistance attainable.

I have now discovered a process for producing improved vulcanizates of carboxylated butadiene-acrylonitrile polymers by the incorporation into the polymer during compounding of an epoxidized hydrocarbyl compound.

The present invention is directed to a process for the production of an improved vulcanizate of a carboxylated butadiene-acrylonitrile polymer wherein the polymer is compounded with at least one filler and vulcanization active agents prior to vulcanization, the improvement being the addition to the polymer during the compounding of an epoxidized hydrocarbyl compound in an amount ranging from about 2.5 to about 30 parts by weight of epoxidized hydrocarbyl compound per 100 parts by weight of carboxylated butadiene-acrylonitrile polymer.

Carboxylated butadiene-acrylonitrile polymers, generally referred to as carboxylated nitrile polymers, are copolymers of butadiene, acrylontrile and an unsaturated carboxylic monomer. Suitable unsaturated carboxylic monomers for the carboxylated nitrile polymers used in the present invention include acrylic acid, methacrylic acid, crotonic acid, oleic acid and the like. The polymers may be prepared by the well known emulsion free radical polymerization process. The acrylonitrile content of the polymer is from about 20 to about 40, preferably from about 25 to about 35, weight percent of the polymer. The unsaturated carboxylic monomer content of the polymer is from about 2 to about 10, preferably from about 4 to about 9, weight percent of the polymer. Butadiene forms the balance to 100 percent of the polymer. The molecular weight of the polymer is usually within the Mooney range (ML 1+4 at 100° C.) of about 40 to about 80.

The epoxidized hydrocarbyl compound added as plasticizer is a hydrocarbyl compound which has been chemically modified to contain epoxy oxygen groups. The epoxide content of the epoxidized hydrocarbyl compound is usually from about 3 to about 10 percent, expressed as oxirane oxygen. Suitable such epoxidized hydrocarbyl compounds include epoxidized octyl stearate, epoxidized octyl tallate, epoxidized soybean oil and epoxidized linseed oil. Epoxidized hydrocarbyl compounds useful in the present invention do not include the materials generally known as epoxy resins, such as the reaction product of epichlorohydrin and bisphenol A.

The quantity of epoxidized hydrocarbyl compound added during compounding to the carboxylated nitrile polymer is from about 2.5 to about 30 parts by weight of epoxidized hydrocarbyl compound per 100 parts by weight of carboxylated nitrile polymer. Preferably the amount of epoxidized hydrocarbyl compound added is from about 5 to about 20 parts by weight per 100 parts by weight of carboxylated nitrile polymer. The epoxidized hydrocarbyl compound may also be used in combination with a conventional plasticizer, such as di-octyl phthalate, providing that the amount of epoxidized hydrocarbyl compound is from 5 to about 20 parts by weight and the amount of conventional non-epoxidized plasticizer is less than about 10 parts by weight and does not exceed the parts by weight of epoxidized hydrocarbyl compound, all parts being per 100 parts by weight of carboxylated nitrile polymer.

Vulcanization active agents include the well known sulphur and sulphur compounds, organic peroxides, metal oxides and metal peroxides.

When a conventional plasticizer, such as di-octyl phthalate, is added during compounding to a carboxylate nitrile polymer, the Mooney of the compound is lower than when no plasticizer is present, generally in proportion to the amount of plasticizer added. The vulcanizates obtained from compounds containing a plasticizer such as di-octyl phthalate generally have, in comparison with vulcanizates obtained from compounds containing no plasticizer, lower hardness, lower modulus at both 100% and 300% elongations, usually a lower tensile strength and usually an equivalent or higher compression set. The vulcanizate thus is generally more flexible and usually retains improved flexibility to lower temperatures than vulcanizates not containing plasticizer, but has somewhat reduced strength properties.

When a epoxidized hydrocarbyl compound is used as plasticizer for carboxylated nitrile polymers, the compound Mooney is lower as the amount of plasticizer is increased, but generally is higher than if an equivalent amount of conventional plasticizer had been used. The corresponding vulcanizates generally have a lower modulus at 100% elongation and a 300% modulus which ranges from marginally lower to higher when compared to vulcanizates containing no plasticizer. Vulcanizates containing epoxidized hydrocarbyl compound plasticizer generally have higher tensile strengths than vulcanizates containing conventional plasticizer. Most importantly, the compression set is lower for vulcanizates containing the epoxidized hydrocarbyl compound plasticizer and significantly lower than for vulcanizates containing a conventional plasticizer such as di-octyl phthalate. The reduction in hardness due to the presence of the epoxidized hydrocarbyl compound is found to be about the same as the reduction in hardness when di-octyl phthalate is used as the plasticizer.

Thus, by using the process of the present invention, it is possible to achieve the benefits normally obtained with conventional plasticizers but also, and most importantly and unexpectedly, to achieve significant improvements in the strength and compression set properties of the vulcanizates.

The vulcanizates of the present invention may be used in applications where nitrile polymers are used, including O-rings, seals, abrasion resistant rolls, etc.

In the following examples, all parts are parts by weight. The test methods used to determine the vulcanizate properties were all ASTM procedures normally used in the rubber industry. For the compression set measurements the vulcanizates have been cured for twice the time shown and aged for 70 hours at 100° C., except for Example 3 where the vulcanizates were cured for 1.5 times the time shown before aging.

EXAMPLE 1

A commercially available carboxylated butadiene-acrylonitrile polymer was compounded with varying amounts of di-octyl phthalate as a known prior art plasticizer and with an epoxidized soybean oil as illustrative of the present invention. The polymer used was KRYNAC 221 (KRYNAC is a Registered Trade Mark) which is believed to contain about 7 weight percent of carboxylated monomer and about 28 weight percent of acrylonitrile and which has a Mooney (ML 1+4 and 100° C.) of about 50. The epoxidized soybean oil used was PARAPLEX G-62 (PARAPLEX is a Registered Trade Mark) which contains about 7 weight percent of oxirane oxygen. The details of the compounds and the vulcanizate properties are shown in Table I in which KRYNAC PA-50 is a mixture of 50 parts of zinc peroxide and 50 parts of a butadiene-acrylonitrile rubber. The compounds were mixed, using conventional procedures, in a laboratory scale internal mixer except for the curvatives which were subsequently added on a cool rubber mill.

TABLE I

| Expt. No. | 1 | 2 | 3 | 4 | 5 | 6 | 7 |
|---|---|---|---|---|---|---|---|
| KRYNAC 221 parts | | | | 95 | | | |
| Sulphur parts | | | | 0.3 | | | |
| Stearic acid parts | | | | 1 | | | |
| Polyethylene AC-617 parts | | | | 3 | | | |
| HISIL* 210 parts | | | | 25 | | | |
| HISIL* EP parts | | | | 25 | | | |
| KRYNAC PA-50 parts | | | | 10 | | | |
| N-Oxydiethylene benzothiazole sulphenamide parts | | | | 3 | | | |
| PENNAC* TM parts | | | | 1 | | | |
| Di-octyl phthalate parts | 0 | 5 | 10 | 0 | 0 | 0 | 5 |
| PARAPLEX G-62 parts | 0 | 0 | 0 | 5 | 7.5 | 10 | 5 |

TABLE I-continued

| Expt. No. | 1 | 2 | 3 | 4 | 5 | 6 | 7 |
|---|---|---|---|---|---|---|---|
| Compound Mooney ML 1 + 4 at 100° C. | 101 | 85 | 72 | 97 | 88 | 83 | 82 |
| Cure time at 166° C. minutes | 8 | 8 | 8 | 11 | 11 | 11 | 11 |
| Vulcanizate Properties | | | | | | | |
| Tensile Strength kg/cm$^2$ | 208 | 226 | 194 | 247 | 234 | 226 | 201 |
| 100% Modulus kg/cm$^2$ | 48 | 35 | 30 | 39 | 39 | 40 | 32 |
| 300% Modulus kg/cm$^2$ | 135 | 95 | 79 | 132 | 133 | 136 | 107 |
| Elongation % | 420 | 570 | 580 | 470 | 440 | 440 | 480 |
| Hardness Shore A2 | 84 | 75 | 75 | 81 | 80 | 77 | 76 |
| Compression Set % | 71 | 80 | 68 | 62 | 55 | 50 | 57 |

*HISIL and PENNAC are Registered Trade Marks

Experiments Nos. 1, 2 and 3 are controls and show the expected effects due to the addition of a conventional plasticizer—i.e. reduced compound Mooney, generally lower strength properties and reduced hardness. Experiments Nos. 4, 5 and 6 show the unusual effects due to the addition of epoxidized soybean oil as compared to the di-octyl phthalate plasticizer—i.e. somewhat reduced compound Mooney, slightly reduced 100% modulus, essentially unchanged 300% modulus, higher tensile strength and significantly lower compression set. Experiment No. 7 shows that the addition of a mixture of di-octyl phthalate and epoxidized soybean oil yields a vulcanizate having the high strength properties and lower compression set.

EXAMPLE 2

Following the procedure of Example 1, further vulcanizates were prepared and tested. The polymers used were KRYNAC 211, which is believed to contain about 9 weight percent of carboxylated monomer and about 25 percent of acrylonitrile and has a Mooney (ML 1+4 at 100° C.) of about 55, and KRYNAC 221. The data are provided in Table II, in which the high strength properties and low compression set are readily seen in comparison with the vulcanizates containing di-octyl phthalate. Experiments Nos. 1 and 4 are controls using di-octyl phthalate as the plasticizer and Experiment No. 3 contains no plasticizer.

TABLE II

| Expt. No. | 1 | 2 | 3 | 4 | 5 | 6 | 7 |
|---|---|---|---|---|---|---|---|
| KRYNAC 211 parts | 95 | 95 | — | — | — | — | — |
| KRYNAC 221 parts | — | — | 95 | 95 | 95 | 95 | 95 |
| Di-octyl phthalate parts | 10 | — | — | 10 | — | — | — |
| PARAPLEX G-62 parts | — | 10 | — | — | 10 | 15 | 20 |
| Compound Mooney ML 1 + 4 at 100° C. | 124 | 143 | 100 | 77 | 92 | 101 | 69 |
| Cure time at 166° C. minutes | 11 | 11 | 10 | 11 | 12 | 15 | 15 |
| Vulcanizate Properties | | | | | | | |
| Hardness Shore A-2 | 77 | 77 | 81 | 79 | 78 | 77 | 76 |
| Tensile Strength kg/cm$^2$ | 190 | 225 | 226 | 197 | 235 | 217 | 196 |
| 100% Modulus kg/cm$^2$ | 52 | 76 | 42 | 32 | 46 | 55 | 44 |
| 300% Modulus kg/cm$^2$ | 136 | 210 | 108 | 80 | 140 | 182 | 136 |
| Elongation % | 425 | 320 | 500 | 600 | 450 | 360 | 400 |
| Compression Set % | 67 | 49 | 64 | 63 | 49 | 38 | 39 |

EXAMPLE 3

Epoxidized soybean oil was evaluated as plasticizer, in comparison with di-octyl phthalate, for carbon black filled vulcanizates in a variety of vulcanization recipes. The details are shown in Table III, in which Experiment No. 1 is a control. Comparison of Experiments 1 and 2, which are identical except for the plasticizer, shows that the vulcanizate containing epoxidized soybean oil possesses high strength and low compression set properties.

TABLE III

| Expt. No. | 1 | 2 | 3 | 4 |
|---|---|---|---|---|
| KRYNAC 221 parts | | 95 | | |
| Sulphur parts | 0.3 | 0.3 | 0.3 | — |
| Stearic acid parts | | 3 | | |
| Carbon black (N-660) parts | | 60 | | |
| KRYNAC PA-50 parts | | 10 | | |
| Tetramethyl thiuram monosulphide parts | 0.5 | 0.5 | — | — |
| N-oxydiethylene benzothiazole sulphenamide parts | — | — | 3 | — |
| PENNAC TM parts | — | — | 1 | — |
| DI-CUP* 40C parts | — | — | — | 4 |
| Di-octyl phthalate parts | 15 | — | — | — |
| PARAPLEX G-62 parts | — | 15 | 15 | 15 |
| Compound Mooney ML 1 + 4 at 100° C. | 51 | 54 | 52 | 51 |
| Cure time at 166° C. minutes | 30 | 30 | 30 | 30 |
| Vulcanizate Properties | | | | |
| Hardness Shore A-2 | 79 | 83 | 82 | 84 |
| Tensile Strength kg/cm$^2$ | 231 | 246 | 232 | 252 |
| 100% Modulus kg/cm$^2$ | 80 | 130 | 107 | 206 |
| 300% Modulus kg/cm$^2$ | 221 | — | — | — |
| Elongation % | 320 | 190 | 260 | 120 |
| Compression Set % | 40 | 21 | 25 | 13 |

*DI-CUP is a Registered Trade Mark

EXAMPLE 4

Using as the carboxylated nitrile rubber KRYNAC 221 and the procedure of Example 1, further vulcanizates were prepared and tested in which the oxirane oxygen content of the epoxy plasticizer was varied. Plasticizer A is an epoxidized octyl stearate and contains about 3.5 percent of oxirane oxygen, Plasticizer B is an epoxidized soybean oil and contains about 7 percent of oxirane oxygen and Plasticizer C is an epoxidized linseed oil and contains about 9.3 percent of oxirane oxygen. The results are shown in Table IV from which it can be seen that the vulcanizate containing Plasticizer A has a marginal improvement, as compared to the di-octyl phthalate containing vulcanizate in strength properties and an increase in the compression set. The vulcanizates containing Plasticizers B and C both show significant increases in modulus and tensile strength and a significant reduction in compression set.

TABLE IV

| Expt. No. | 1 | 2 | 3 | 4 |
|---|---|---|---|---|
| KRYNAC 221 parts | | 95 | | |
| Di-octyl phthalate parts | 10 | — | — | — |
| Plasticizer A parts | — | 10 | — | — |
| Plasticizer B parts | — | — | 10 | — |
| Plasticizer C parts | — | — | — | 10 |
| Compound Mooney ML 1 + 4 at 100° C. | 76 | 76 | 95 | 100 |
| Cure time at 166° C. | | 10 mins. | | |
| Vulcanizate Properties | | | | |
| Hardness Shore A-2 | 76 | 76 | 79 | 78 |
| Tensile Strength kg/cm$^2$ | 188 | 205 | 209 | 217 |
| 100% Modulus kg/cm$^2$ | 30 | 31 | 41 | 50 |
| 300% Modulus kg/cm$^2$ | 72 | 76 | 122 | 162 |
| Elongation % | 560 | 570 | 430 | 380 |
| Compression Set % | 71 | 83 | 54 | 53 |

EXAMPLE 5

Vulcanizates were prepared and tested using a polymer containing about 25 weight percent of acrylonitrile, about 73 weight percent of butadiene and about 2 weight percent of methacrylic acid. The compounding recipe used was that shown in Example 1. One vulcanizate was prepared which contained no plasticizer, one vulcanizate contained 10 parts of di-octyl phthalate and one vulcanizate contained 10 parts of Plasticizer B of Example 4, this latter vulcanizate being within the scope of the present invention. The results are shown in Table V.

TABLE V

| Expt. No. | 1 | 2 | 3 |
|---|---|---|---|
| Di-octyl phthalate parts | — | 10 | — |
| Plasticizer B parts | — | — | 10 |
| Compound Mooney ML 1 + 4 at 100° C. | 96 | 70 | 74 |
| Cure time at 166° C. minutes | 10 | 10 | 10 |
| Hardness Shore A-2 | 69 | 64 | 65 |
| Tensile Strength kg/cm$^2$ | 184 | 170 | 181 |
| 100% Modulus kg/cm$^2$ | 32 | 26 | 26 |
| 300% Modulus kg/cm$^2$ | 87 | 67 | 66 |
| Elongation % | 580 | 670 | 690 |
| Compression Set % | 68 | 70 | 65 |

What is claimed is:

1. Improved vulcanizates consisting essentially of a carboxylated butadiene-acrylonitrile polymer having a molecular weight within the Mooney range (ML 1+4 at 100° C.) of about 40 to about 80 compounded with (a) at least one filler, (b) vulcanization active agents and (c) from about 2.5 to about 30 parts by weight of an epoxidized hydrocarbyl compound per 100 parts by weight of carboxylated butadiene-acrylonitrile polymer.

2. The improved vulcanizates of claim 1 wherein the carboxylated butadiene-acrylonitrile polymer contains a copolymerized unsaturated carboxylic monomer selected from acrylic acid, methacrylic acid, crotonic acid and oleic acid.

3. The improved vulconizates of claim 2 in which the carboxylated butadiene-acrylonitrile polymer contains from about 20 to about 40 weight percent of acrylonitrile, from about 2 to about 10 weight percent of unsaturated carboxylic monomer, the balance to 100 weight percent being butadiene.

4. The improved vulcanizates of claim 3 wherein the epoxidized hydrocarbyl compound contains from about 3 to about 10 percent of oxirane oxygen.

5. The improved vulcanizates of claim 4 in which the epoxidized hydrocarbyl compound is selected from epoxidized octyl stearate, epoxidized octyl tallate, epoxidized soybean oil and epoxidized linseed oil.

6. The improved vulcanizates of claim 4 in which the amount of epoxidized hydrocarbyl compound is from about 5 to about 20 parts by weight per 100 parts by weight of carboxylated butadiene-acrylonitrile polymer.

7. The improved vulcanizates of claim 5 in which the carboxylated butadiene-acrylonitrile polymer contains from about 25 to about 35 weight percent of acrylonitrile, from about 4 to about 9 weight percent of unsaturated carboxylic monomer, the balance to 100 weight percent being butadiene.

8. The improved vulcanizates of claim 5 in which the amount of epoxidized hydrocarbyl compound is from about 5 to about 20 parts by weight per 100 parts by weight of carboxylated butadiene acrylonitrile polymer.

* * * * *